(12) United States Patent
Spengler (10) Patent No.: US 6,982,021 B2
(45) Date of Patent: Jan. 3, 2006

(54) METHOD AND APPARATUS FOR MAKING A TRIM COMPONENT WITH A FOAM CORE HAVING A SMOOTHLY VARYING THICKNESS

(75) Inventor: Gerhard Spengler, Frankfurt (DE)

(73) Assignee: R+S Technik GmbH, Offenbach am Main (DE)

( * ) Notice: Subject to any disclaimer, the term of this patent is extended or adjusted under 35 U.S.C. 154(b) by 304 days.

(21) Appl. No.: 10/226,550

(22) Filed: Aug. 23, 2002

(65) Prior Publication Data

US 2003/0041955 A1 Mar. 6, 2003

(30) Foreign Application Priority Data

Sep. 4, 2001 (DE) ................................. 101 44 027
Mar. 20, 2002 (DE) ................................. 102 12 450

(51) Int. Cl.
*B32B 31/04* (2006.01)
(52) U.S. Cl. ...................... 156/221; 156/228; 156/245; 156/312; 156/322
(58) Field of Classification Search ................ 156/198, 156/221, 222, 228, 242, 245, 312, 313, 322
See application file for complete search history.

(56) References Cited

U.S. PATENT DOCUMENTS

| | | | |
|---|---|---|---|
| 2,797,179 A | 6/1957 | Reynolds et al. | |
| 4,824,714 A | 4/1989 | Gest | |
| 5,474,841 A | 12/1995 | Matsuki et al. | |
| 5,614,285 A | 3/1997 | Gardill | |
| 5,709,925 A | 1/1998 | Spengler et al. | |
| 5,756,189 A | 5/1998 | Nagano et al. | |
| 5,845,458 A * | 12/1998 | Patel | ......................... 52/782.1 |
| 5,942,321 A | 8/1999 | Romesberg et al. | |
| 5,976,295 A * | 11/1999 | Ang | ........................... 156/219 |
| 6,136,415 A | 10/2000 | Spengler | |
| 6,214,157 B1 | 4/2001 | Spengler | |
| 6,287,678 B1 | 9/2001 | Spengler | |

FOREIGN PATENT DOCUMENTS

| | | |
|---|---|---|
| GB | 2022510 | 12/1979 |
| WO | WO 99/16657 | 4/1999 |

* cited by examiner

Primary Examiner—Gladys J P Corcoran
(74) Attorney, Agent, or Firm—W. F. Fasse; W. G. Fasse (57) ABSTRACT

A trim component includes a foam backing layer and a foam pad insert laminated between a cover material and a substrate. The foam pad insert provides an area of enhanced cushioning, and has smoothly tapered edges to ensure a smooth surface contour without a visible edge transition on the cover material. The foam pad insert has a lower melting temperature than the foam backing layer, both of which are thermoplastics. A foam pad insert is positioned and fixed on the back surface of the foam backing layer. A substrate material is heated and then laminated and molded with the foam and the cover material. The heat from the substrate partially softens and melts the foam backing layer and the foam pad insert. The partially melted foam pad insert is viscously deformed to form the tapered edges, as dictated by the smoothly varying mold gap spacing of the forming tools.

27 Claims, 7 Drawing Sheets

METHOD AND APPARATUS FOR MAKING A TRIM COMPONENT WITH A FOAM CORE HAVING A SMOOTHLY VARYING THICKNESS

PRIORITY CLAIM

This application is based on and claims the priority under 35 U.S.C. §119 of German Patent Applications 101 44 027.8, filed on Sep. 4, 2001 and 102 12 450.7, filed on Mar. 20, 2002, the entire disclosures of which are incorporated herein by reference.

FIELD OF THE INVENTION

The invention relates to a method and an apparatus for making a trim component, such as an interior trim component for a motor vehicle, including a structural supporting substrate, a decorative cover material, and a soft elastic foam core therebetween, whereby at least a partial defined area of the trim component has at least one of a greater softness, shock absorption ability, or material thickness, due to the locally varied characteristic of the foam core. Especially, the foam core has a smoothly varying or tapering thickness in at least a selected area.

BACKGROUND INFORMATION

It is generally known in the art to manufacture interior trim components for motor vehicles, such as door interior panels, trim inserts, dashboards, or consoles for example, from several individual layers of different materials. For example, it is typical to provide a thin-walled structural supporting layer as a substrate, a decorative cover material such as a decorative vinyl film, a synthetic leatherette layer, or a fabric, to cover the substrate, and a soft elastic material such as a synthetic polymer foam at least at one or more defined locations between the cover material and the substrate to provide a cushioned "soft touch" effect at this respective location.

It is also known to provide a foam layer or core between the cover material and the substrate, whereby this foam layer or core has a varying thickness at different locations of the trim component, for example including a substantially uniform foam layer thickness over most of the area of the trim component, and a greater thickness of the foam material at one or more areas that are intended to have an increased cushioning effect. Various different methods are known for manufacturing such foam cushioned trim components.

As a first example, it is known to pre-fabricate a form-stable structural supporting substrate of a synthetic plastic by means of an injection molding process, or of a wood fiber or natural fiber material by means of a press forming or molding process.

Thereby, the substrate is formed or molded to have the required three-dimensional contour shape. Next, one or more pre-cut foam insert members are glued with an adhesive onto appropriate defined locations on the pre-manufactured substrate, and then the entire unit including the substrate and the foam members fixed thereon is coated with an adhesive. Then, a decorative cover material layer is adhesively bonded and laminated onto the adhesive-coated substrate using a vacuum or pressing process.

It is a serious disadvantage that this known process requires four separate process steps or procedures. It is a further disadvantage that the required adhesives are not environmentally friendly and add an additional process step and complexity to the method. Perhaps most importantly, another significant aesthetic disadvantage is that the thick edges of the uniformly-thick foam insert members form rather sharp steps or transitions in the surface contour of the decorative cover material, so that the location and boundaries of the foam insert area are clearly visible due to this stepped transition of the surface of the cover material. In such a conventional method, it is not possible to achieve a smooth outer surface of the cover material, under which the foam cushioned areas are completely hidden.

A second conventional method also involves separate pre-fabrication of a formed or contoured structural substrate. The pre-fabricated substrate is then placed into an injection molding tool, and then a foaming polyurethane resin is injected into a cavity of the molding tool, so as to apply the foaming material directly onto the substrate. With an appropriate contouring of the molding tool, the thickness of the resulting foam material can be varied as desired, i.e. so that the foam material has the desired contour, and especially to avoid an abrupt step or transition in the thickness of the foam. After the foam has cured and solidified, the substrate and the foam thereon are coated with an adhesive, and then a decorative cover material is laminated thereon.

An advantage of this second known process is that the injected foam layer or pad can have the desired varying contour thickness so as to avoid a visually observable step or contour transition along the edges of the softer or more-cushioned area. It is a disadvantage, however, that this method requires at least four process steps or procedures. The materials used (e.g. polyurethane) are not very environmentally friendly. The foam injection equipment and molding tools increase the capital investment costs and the complexity of the method. Since the foam injection step followed by the curing and solidifying of the injected foam material requires substantially more time than the other steps of the method, it is typically necessary to provide plural injection molds or multi-position molding stations for each single manufacturing line, to avoid slowing down the overall production.

SUMMARY OF THE INVENTION

In view of the above, it is an object of the invention to provide a method and an apparatus for manufacturing a trim component of the above described general type, with a foam core having a smoothly varying thickness so that the finished product has at least one area with a greater foam thickness and a softer or enhanced cushioning effect, while avoiding the visual appearance on the cover material surface of any transition or step around the edges of the area having the enhanced cushioning. It is a further object of the invention to simplify the method and the apparatus, so that the capital investment cost as well as the ongoing operating costs of manufacturing such trim components can be reduced. The invention further aims to avoid or overcome the disadvantages and the disadvantageous features of the prior art, and to achieve additional advantages, as apparent from the present specification. Nonetheless, the attainment of these objects singly or collectively is not a limitation of the invention.

The above objects have been achieved according to the invention in a method of making a multi-layered trim component. The method involves providing a decorative cover material, a foam backing layer, a structural substrate, and a foam pad insert block of a thermoplastic polymer foam. The method further proceeds with positioning and then preferably fixing the foam pad insert block on the foam backing layer, arranging the materials so that the foam backing layer is between the decorative cover material and the structural substrate with the foam pad insert block between the foam backing layer and the structural substrate, and then applying heat and pressure so as to partially melt or soften the foam pad insert block so that the foam pad insert block is deformed and molded to form a foam pad insert having a sectional shape with a smoothly tapered edge or rim between the foam backing layer and the structural substrate.

The application of heat and pressure preferably further partially melts or softens the foam backing layer and the structural substrate, so that the foam pad insert, the foam backing layer, and the structural substrate are thermoplastically melt-bonded respectively with each other. The application of heat and pressure thereby laminates the several materials to each other, while three-dimensionally molding or forming the layered arranged into the required final shape of the trim component. It is further preferred according to the inventive method, that the applied heat is provided by pre-heating the structural substrate to a temperature above the softening or melting temperature of the foam pad insert block. The heat emitted by the pre-heated structural substrate, through its pressed contact with the foam pad insert block, thus sufficiently heats the foam pad insert block for softening or partially melting the foam pad insert block.

After cooling, the laminated, molded arrangement is the essentially finished trim component, in which the foam pad insert laminated between the foam backing layer and the structural substrate provides an area with increased cushioning and/or softness and/or shock absorption ability and/or material thickness. The smoothly tapered edges of the foam pad insert laminated between the foam backing layer and the structural substrate ensure that the outer surface of the cover material follows a desired smooth surface contour, without any visually apparent step or transition at the edges of the enhanced cushioning area.

According to further preferred embodiment details of the invention, both the foam backing layer and the foam pad insert block respectively consist of one or more thermoplastic synthetic foams, and particularly a polyolefin foam, whereby the foam backing layer has a higher temperature resistance, e.g. a higher melting or softening temperature, and/or a higher density, than the foam of the foam pad insert block. These differing material characteristics of the foam pad insert block relative to the foam backing layer ensure that the foam pad insert block will be softened or partially melted to a greater extent than the foam backing layer, by the heat provided by the pre-heated structural substrate. Thus, the partially melted foam pad insert block will be viscously molded and deformed to have a smoothly or gradually tapering rim with a tapered feather-edge, under the influence of the pressure applied by the forming tools and under the influence of the mold contour of the forming tools. On the other hand, the foam backing layer will not be melted to such an extent, but instead will only be melt-bonded and laminated onto the structural substrate and three-dimensionally molded to have the contour prescribed by the forming tool mold contours.

For example, the foam material of the foam pad insert block has a melting or softening temperature in a range from 120 to 160° C., while the foam backing layer has a melting or softening temperature in a range from 150 to 200° C. (preferably about 160° C.). In this example context, the structural substrate is pre-heated to 200° C. immediately before being laminated onto and pressed with the foam pad insert block and the foam backing layer, so that the substrate emits heat into the foam materials. This ensures that the foam pad insert block will undergo a greater degree of melting and viscous deformation than the foam backing layer.

Also, to avoid the need of separate adhesives, the substrate preferably comprises a thermoplastic material, e.g. polyolefin fibers (preferably polypropylene fibers), as a binder or matrix, preferably together with reinforcing fibers such as natural fibers dispersed and intermingled in the matrix to form a fiber fleece composite mat. Thereby, the thermoplastic binder or matrix of the substrate also becomes softened or partially melted, and can be melt-bonded directly with the thermoplastic material of the foam pad insert and of the foam backing layer.

The above objects have further been achieved according to the invention in an apparatus for making a trim component as generally described above. The apparatus comprises a molding or forming station that includes a molding or forming press having an upper forming tool and a lower forming tool, as well as a clamping or tentering frame that holds the decorative cover material, the foam backing layer, the foam pad insert block, and the structural substrate layer between the upper and lower forming tools. The apparatus also includes transport devices for transporting the substrate layer on the one hand, and the cover material, the foam backing layer, and the foam pad insert block, which have been pre-laminated together, on the other hand.

The upper forming tool and the lower forming tool are not heated and do not include any active heating means. To the contrary, the forming tools preferably include cooling or tempering liquid flow passages to remove heat and thereby cool the forming tools and the laminated molded product being formed therebetween. Thus, the forming tools do not apply any heat to the layer materials. Instead, the heat necessary for partially melting and melt-bonding the contact surfaces of the several materials, and for allowing the viscous deformation of the foam pad insert block to form its smoothly tapering edges is provided predominantly or exclusively from the heat being given off by the pre-heated substrate material. Thus, the apparatus preferably further includes a separate heater arrangement for preheating the substrate material, for example a contact platen heater, or an infrared heater, or a hot air heater, for heating the substrate material to e.g. 200° C.

The pre-heated substrate material on the one hand, and the pre-laminated cover material, foam backing layer, and foam pad insert block on the other hand, can be separately transported into position between the upper and lower forming tools, whereby the materials are then pressed, molded and laminated together. Alternatively, the apparatus may further include a pre-pressing arrangement that includes a heated press platen on which the pre-heated substrate material is supported, and a cooled or tempered press platen which contacts the cover material, while pressing and thereby pre-laminating the cover material, the foam layer, and the foam pad insert block onto the substrate material. In this case, the resulting pre-laminated sandwich packet is then transported as a unit into position between the upper and lower forming tools to be further pressed and molded therebetween.

The respective mold surfaces of the upper and lower forming tools have different mold contours so as to form a varying mold gap therebetween. Particularly, in the area that is to have the enhanced cushioning in the final product, i.e. the area in which the additional foam insert pad is provided, the mold gap has an increased thickness or gap spacing distance. The mold surface that contacts the substrate material is smoothly contoured so that the mold gap also smoothly tapers from the area having the increased mold gap spacing to the remaining areas having a substantially constant mold gap spacing. This variation of the mold gap exerts the appropriate molding force and contour for deforming and molding the partially melted or softened foam pad insert block so as to form the smoothly or gradually tapered edges thereof as described above.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
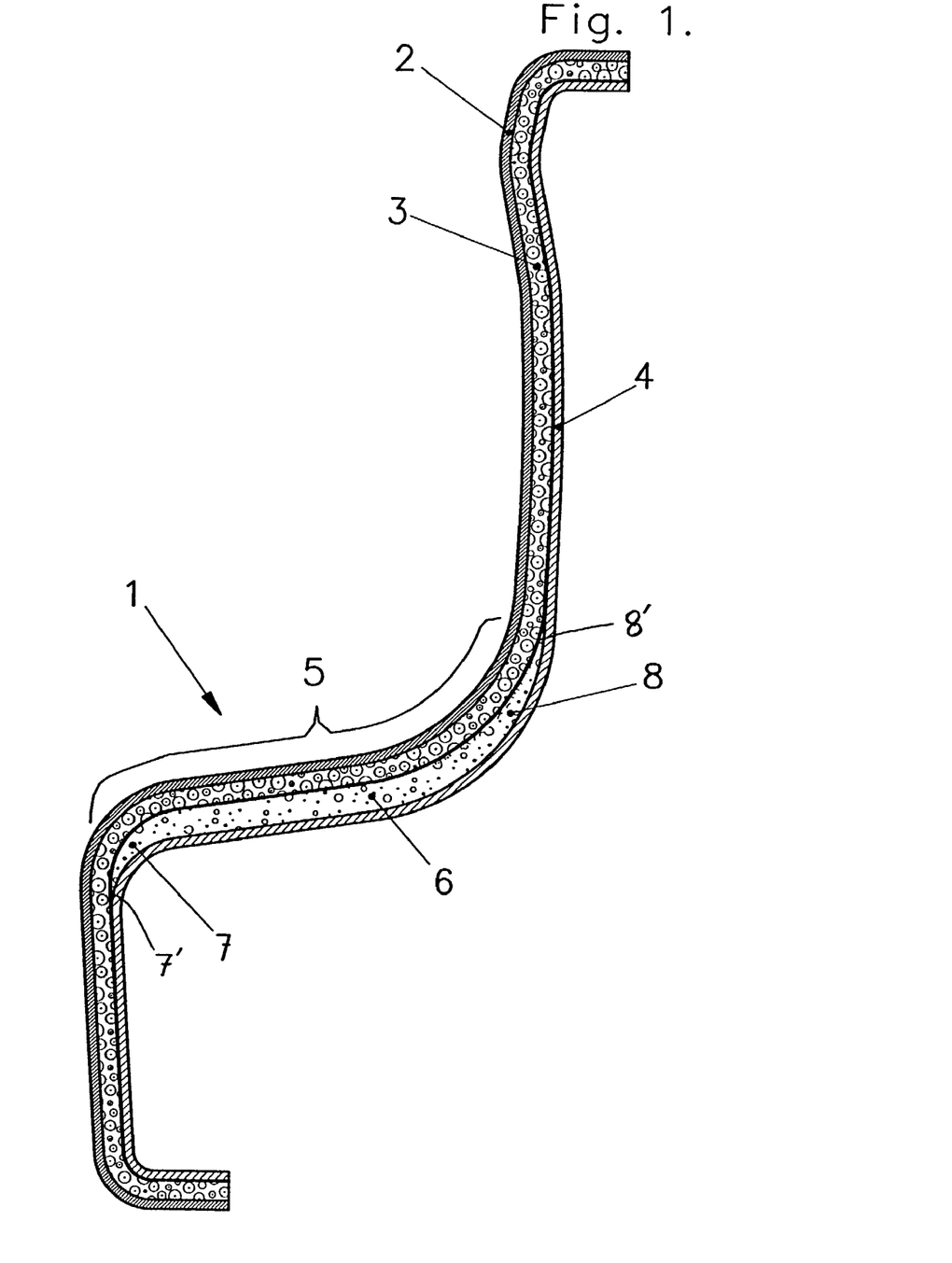
FIG. 1 is a sectional view of a broken portion of a trim component according to the invention, as an example an automobile door interior trim panel with a cushioned armrest area.

FIG. 1 schematically shows a cross-section of a trim component 1 according to the invention, for example embodied as an automobile door interior panel 1. The trim component 1 includes a decorative cover material 2, e.g. a fabric, a vinyl film, a synthetic leatherette film, or the like, a foam backing layer 3, and a structural substrate 4.

The foam backing layer 3 has a nominal uniform thickness along the entire trim component 1 to provide an overall "soft touch" cushioned feel to the trim component 1. The foam backing layer 3 comprises a thermoplastic synthetic polymer foam, preferably a polyolefin foam such as a polyethylene or polypropylene foam. The cover material 2 and the foam backing layer 3 may be provided as a pre-laminated foam-backed cover stock, for example a conventionally known PVC/TPO film. Alternatively, the cover material 2 and the foam backing layer 3 can be provided as separate sheet materials that are melt-bonded and laminated to each other in the course of the inventive method.

The structural substrate 4 is initially provided as a sheet or mat of substrate material, which preferably comprises a composite of natural fibers and thermoplastic synthetic polymer fibers, such as polypropylene fibers, as a binder. During the course of the inventive method, this substrate material is compressed, partially melted, laminated onto the other materials, and three-dimensionally molded into the desired finished three-dimensional shape of the trim component 1, and cooled so that it hardens and stiffens into the finished state of the structural substrate 4. In the finished state, the structural substrate 4 is form-stable to maintain the desired shape of the trim component 1, and substantially rigid, i.e. having the required degree of rigidity for maintaining the structural shape of the overall trim component 1.

Especially according to the invention, the trim component 1 further includes a foam pad insert 6 laminated between the foam backing layer 3 and the structural substrate 4, at an area 5 of the trim component 1 that is to be provided with an enhanced cushioning, i.e. a softer cushion feel and/or an enhanced shock absorption capacity and/or an increased foam material thickness. For example, this enhanced cushioning area 5 corresponds to the area of a cushioned armrest of the trim component 1 embodied as a motor vehicle door interior trim panel. The foam backing layer 3 and the foam pad insert 6 are laminated to each other, so that together they form a foam core between the cover material 2 and the substrate 4 of the trim component 1. The foam pad insert 6 and the foam backing layer 3 each respectively preferably consist of a thermoplastic synthetic polymer foam, and particularly a polyolefin foam, such as a polyethylene or polypropylene foam.

As mentioned above, the foam backing layer 3 has a substantially constant thickness at all areas of the trim component 1 including the enhanced cushioning area 5. To achieve the enhanced cushioning at the area 5, the foam pad insert 6 provides a greater total thickness of the foam core at this area. To ensure that this increased thickness of the foam core does not cause a visually observable bump, step or transition on the exposed surface of the cover material 2 at the edges of the area 5, the rims of the foam pad insert 6 are configured as gradually or smoothly tapering rims 7 and 8 terminating at acutely tapered feather-edges 7' and 8'. In other words, the cross-sectional configuration of the foam pad insert 6 has a smoothly tapering thickness at the tapering rims 7 and 8, so that these rims 7 and 8 smoothly taper and transition flushly into the back surface of the foam backing layer 3 at the feather-edges 7' and 8' of the foam pad insert 6. Thus, the total thickness of the foam core, including the foam backing layer 3 and the foam pad insert 6, varies smoothly with-out a step or sharp transition. As a result, the exposed surface of the cover material 2 has a smooth curved contour over the area 5, without any visually observable transition at the edges or rim of the foam pad insert 6. Generally, the cross-sectional shape of the tapering feather-edges 7' and 8' can be described as a wedge-shaped taper or acute angle taper, but does not necessarily terminate at a sharp vertex along the edge, which instead may be slightly rounded or blunted.

According to the invention, it is preferred that the thermoplastic foam material of the foam pad insert 6 has a lower melting or softening temperature and/or a lower density than the thermoplastic foam material of the foam backing layer 3. Particularly, as a preferred example, the foam material of the foam pad insert 6 has a melting or softening temperature in the range of 120 to 160° C., while the foam material of the foam backing layer 3 has a melting temperature of about 160° C. (e.g. ±5° C.), or 150 up to about 200° C. These differing temperature resistance characteristics will allow the foam backing layer 3 and the foam pad insert 6 to be melt-bonded to each other and to the substrate 4, while also allowing the foam pad insert 6 to be partially melted and viscously molded and deformed without substantially melting and deforming the foam backing layer 3.

Figure 2:
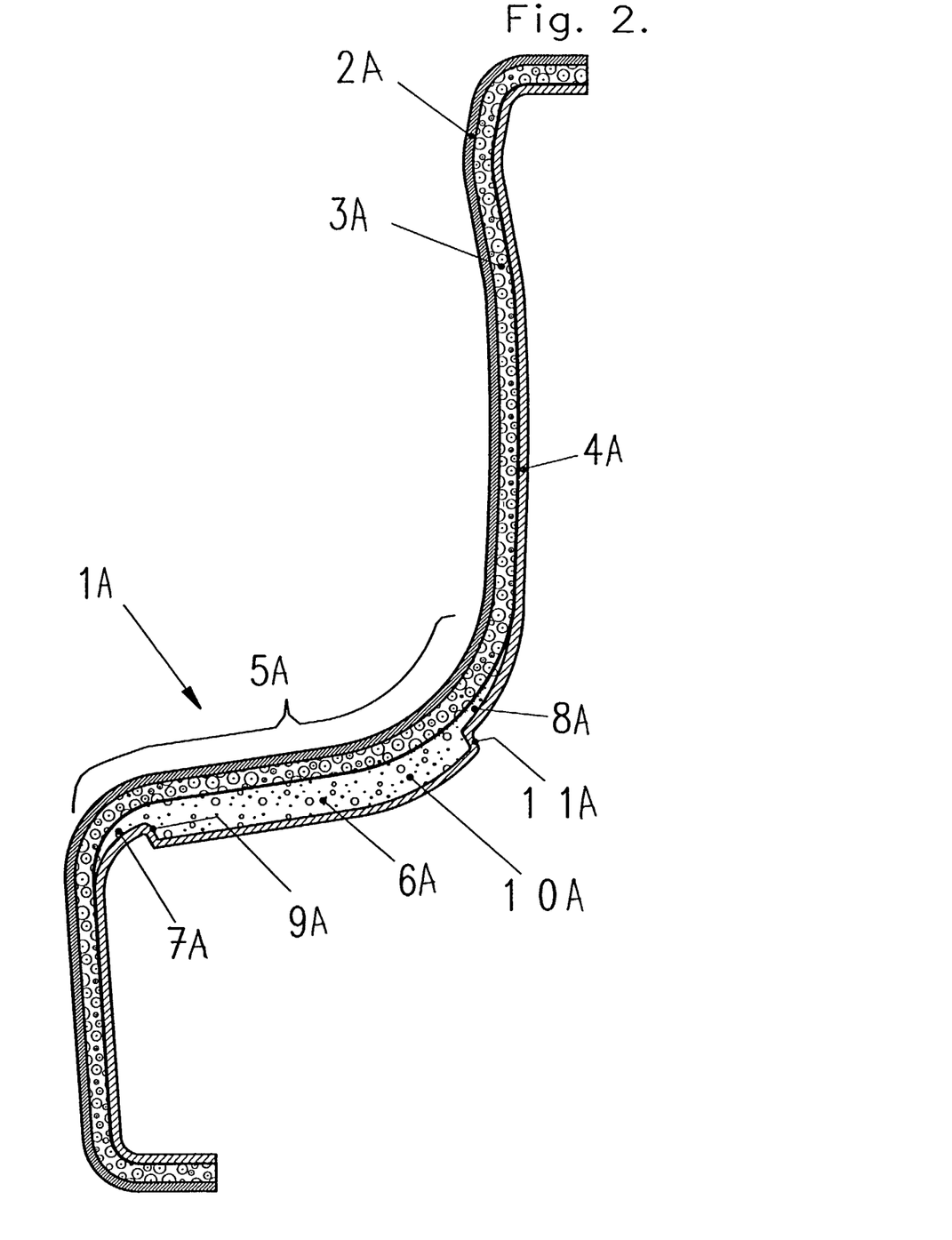
FIG. 2 is a sectional view similar to that of FIG. 1, but showing a varied embodiment of a trim component according to the invention.

FIG. 2 shows a second embodiment of a trim component 1A that generally corresponds to the trim component 1 according to FIG. 1, except for a different cross-sectional configuration of the foam pad insert. The components of the trim component 1A corresponding to those of the trim component 1 of FIG. 1 are respectively labeled in FIG. 2 with the same reference number as in FIG. 1, merely supplemented with the suffix A. Thus, the details will not be described again, but generally, the trim component 1A includes a cover material 2A, a substrate 4A and a foam backing layer 3A therebetween. The foam pad insert 6A is arranged at the area 5A between the foam backing layer 3A and the substrate 4A and includes acutely angled tapering rims 7A and 8A similarly as described in connection with FIG. 1.

However, in contrast to the foam pad insert 6 of FIG. 1, the present foam pad insert 6A of FIG. 2 additionally has a thicker central portion 10A, which transitions through respective thickness steps 9A and 11A into the tapering rims 7A and 8A. These thickness steps 9A and 11A correspond with a similar stepped configuration of the structural substrate 4A at these locations. Since these thickness steps 9A and 11A protrude out from the back of the substrate 4A, i.e. away from the exposed surface of the cover material 2A, even these thickness steps 9A and 11A do not form or cause any visually apparent step or transition on the exposed surface of the cover material 2A. The tapering rims 7A and 8A ensure that the side of the resulting foam core facing toward the cover material 2A has a smooth continuous curved contour without any step transition.

Figure 3:
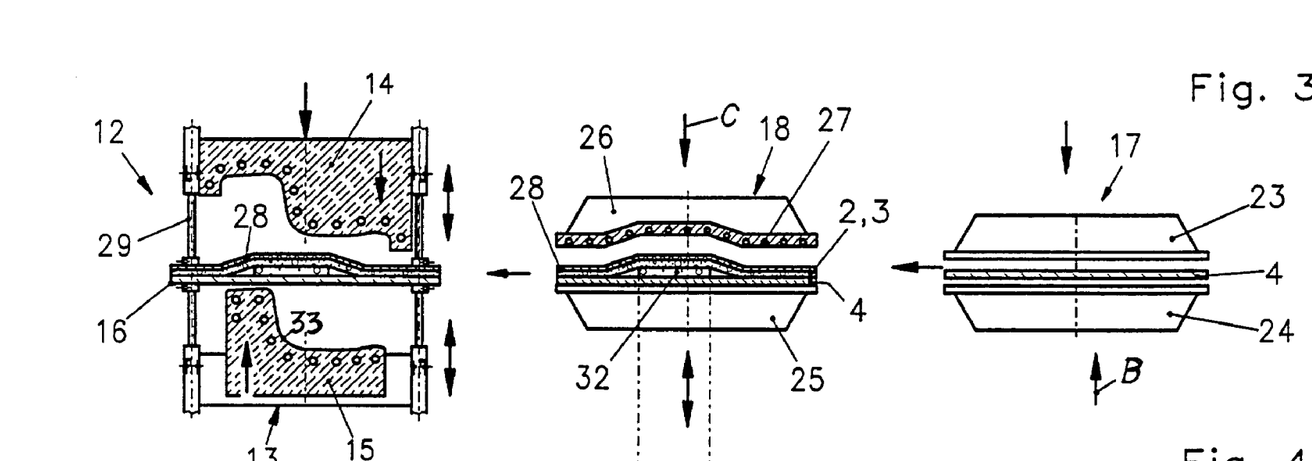
FIG. 3 is a schematic sectional side view of essential components of an apparatus for carrying out the inventive method.
Figure 4:
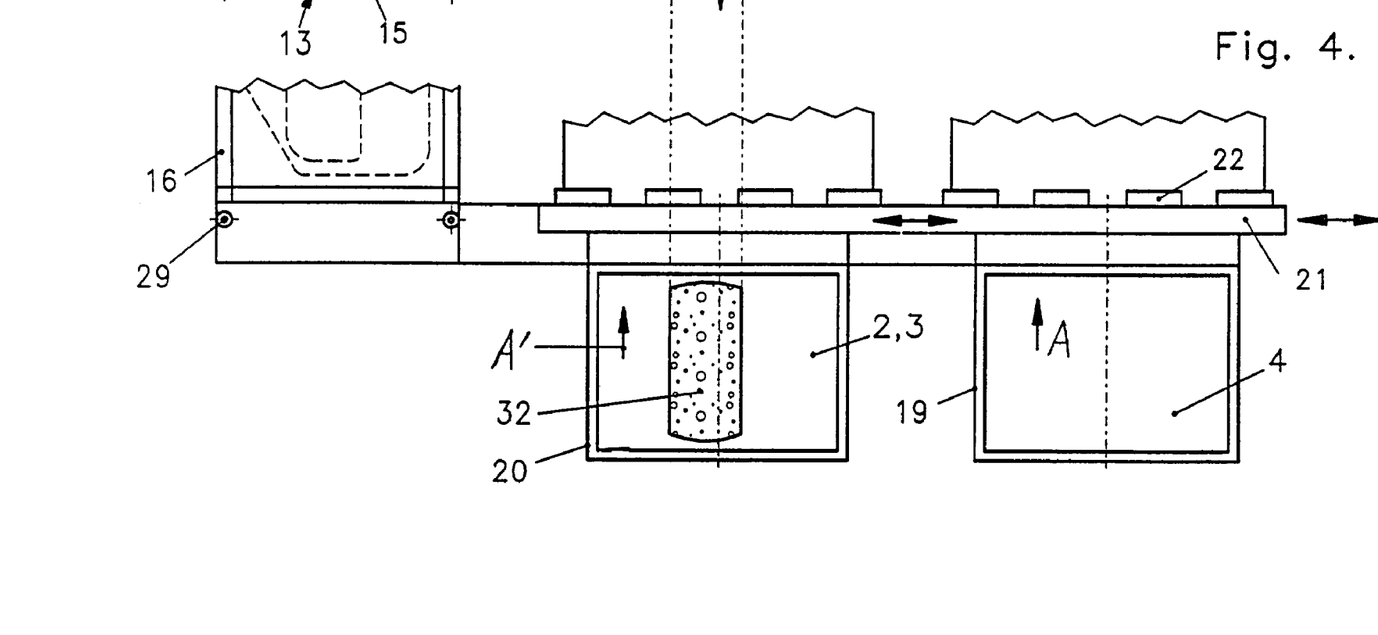
FIG. 4 is a schematic top plan view of a broken portion of several components of the overall apparatus corresponding to FIG. 3.

FIGS. 3 and 4 show an apparatus or overall system for carrying out the inventive method of making the above described trim component 1 or 1A. The overall apparatus or system includes a heating station 17 comprising a heater arrangement, a pre-pressing station 18 comprising a pre-pressing arrangement, a molding or forming station 12, a substrate material supply device 19, a foam and cover material supply device 20, and a transport device 21 such as a high precision (±1 mm) transfer shuttle 21.

The heater arrangement 17 may comprise a contact heater, an infrared radiant heater arrangement, or a hot air heater arrangement, for example. In the present embodiment, the heater arrangement 17 includes an upper heater platen 23 and a lower heater platen 24 that can each be heated to at least the required pre-heating temperature of the substrate material 4, e.g. 200° C. The two heater platens 23 and 24 are movable relative to each other so as to be able to receive and then contact and press the substrate material 4 therebetween.

The pre-pressing arrangement 18 includes a lower heated press platen 25, which may be heated, for example to 200° C., and an upper tempered press platen 26, which includes cooling or tempering liquid passages 27 therein, for flowing through a cooling or tempering liquid (e.g. water) so as to maintain the upper press platen at a cooler temperature, e.g. about 80° C., to avoid charring or otherwise damaging the cover material 2. These two press platens 25 and 26 are movable relative to each other so as to receive and then press and laminate the several materials there-between to form a pre-laminated sandwich packet 28, as will be described below.

The molding or forming station 12 comprises a molding or forming press 13 including an upper forming tool 14 and a lower forming tool 15 that are movable relative to each other so as to receive the pre-laminated sandwich packet 28 therebetween, and then press and mold this pre-laminated sandwich packet 28 to form the finished trim component, as will be described below. The forming tools 14 and 15 do not include heaters and are not heated, but rather are tempered by flowing a cooling liquid such as water through cooling passages 33. The molding or forming station 12 further includes a clamping or tentering frame 16 for holding the pre-laminated sandwich packet 28 between the upper and lower forming tools 14 and 15, while allowing the materials to slip or shift as needed for the stretching and deformation of the materials while they are being molded between the forming tools 14 and 15. The clamping or tentering frame 16 is movably supported by supporting stroke devices 29, e.g. piston-cylinder devices 29.

The material supply device 19 supplies a respective sheet of substrate material 4, e.g. from a stack of such sheets, while the material supply device 20 supplies a respective sheet of a cover material 2 and foam backing layer 3, e.g. from a stack of such sheets, respectively into the heater arrangement 17 and the pre-pressing arrangement 18. The transport device or transfer shuttle 21 grasps these material sheets with its gripper claws or clamps 22 and transports the material sheets from the heater arrangement 17 to the pre-pressing arrangement 18, and from there into the forming press 13, with high precision to ensure a precise registration and alignment of the several materials with respect to each other and with respect to the tools.

An exemplary method according to the invention using the apparatus shown in FIGS. 3 and 4 proceeds as follows. A sheet of the substrate material 4 is picked up and transported from the material supply device 19 in the direction of arrows A and B in FIGS. 3 and 4 into the heater arrangement 17. This can be carried out by any known transport arrangement, or the transport shuttle 21, or a combination thereof. The upper and lower heater platens 23 and 24 are heated to about 200° C., and are pressed together with the substrate material 4 therebetween, so as to contact, pre-compress, and heat the substrate material 4 to about 200° C., whereby the substrate material is softened and slightly melted. Once the substrate material 4 has been sufficiently pre-heated, it is moved by the transport device 21 from the heater arrangement 17 into the pre-pressing arrangement 18.

Meanwhile, a pre-laminated arrangement including a pre-cut blank of decorative cover material 2, with a foam backing layer 3 laminated thereon, and a foam pad insert block 32 (which will ultimately become the foam pad insert 6) positioned and fixed on the foam backing layer 3, is picked-up and transported from the material supply device 20 into the pre-pressing arrangement 18 in the direction A'. In this embodiment, the material supply device 20 includes a stack of pre-fabricated pre-laminated units including the cover material 2, the foam backing layer 3, and the foam pad insert block 32. Alternatively, these three components could be separately provided and introduced into the pre-pressing arrangement 18. As a further alternative, the cover material 2 and the foam backing layer 3 can be provided as a pre-laminated sheet, while the foam pad insert block 32 is separately provided and then positioned and fixed on the foam backing layer 3.

Figure 5:
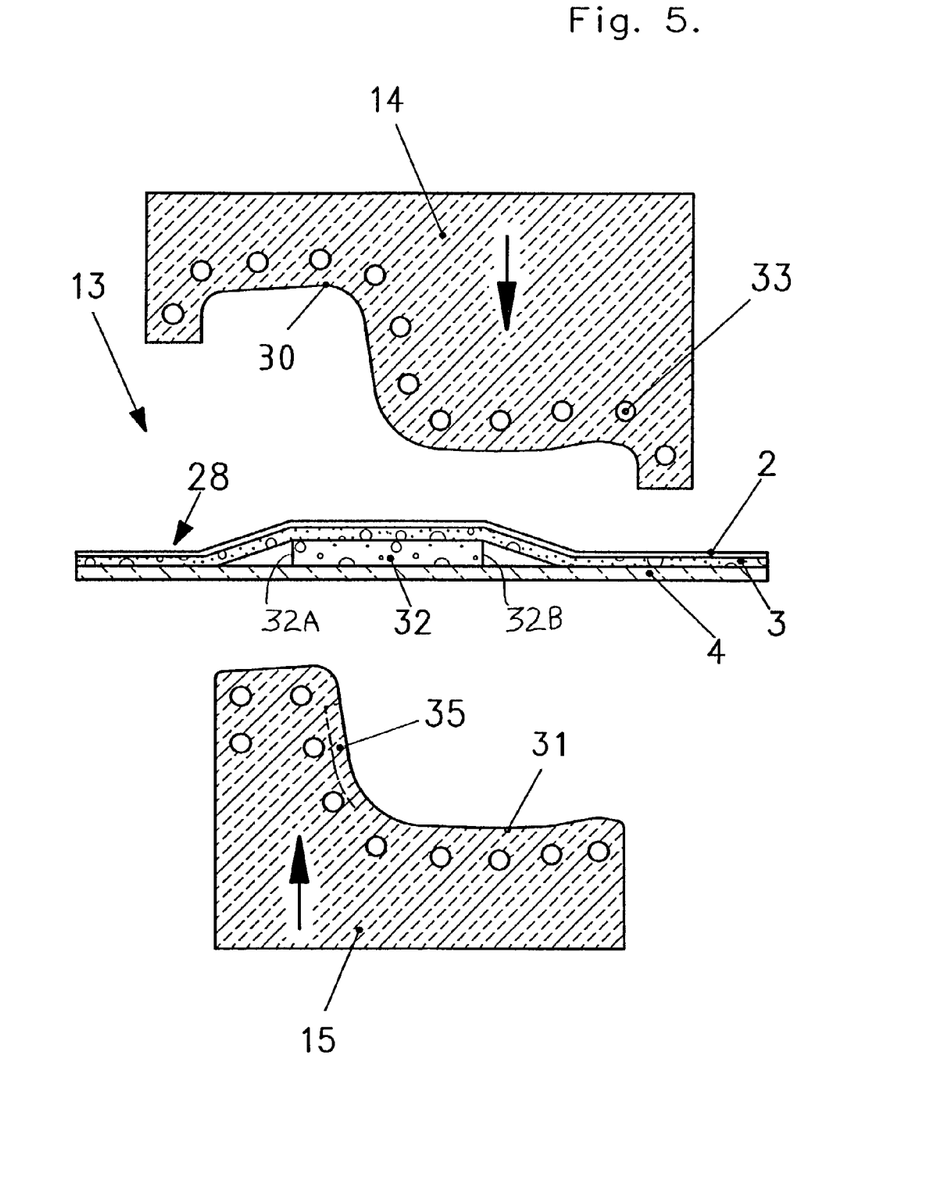
FIG. 5 is a schematic sectional side view of the upper and lower forming tools of the apparatus according to FIG. 3, on an enlarged scale.

In any of the above mentioned different ways of providing the materials 2, 3 and 32, the foam pad insert block 32 is simply a pre-cut, e.g. pre-stamped, rough or raw block of the foam material selected for the foam pad insert 6. The volume or quantity of the foam material is selected to achieve the desired finished deformed size and shape of the foam pad insert 6 as will be described below. As can be seen in FIG. 5, for example, the edges 32A and 32B of the foam pad insert block 32 are square-cut, i.e. perpendicular to the major plane of the block. Also, the plan shape of the block 32 is generally rectangular as shown in FIG. 4. The shape of the block 32 does not need to be a very precise match with the shape of the final cushioned area 5, because the block 32 will be deformed during the subsequent process, as explained below.

In any event, it is necessary to precisely position the foam pad insert block 32 onto the foam backing layer 3 and then fix the block 32 onto the layer 3. This fixing can be achieved by applying a separate adhesive, or by pre-heating the two components so that they can be hot-melt-bonded to each other. The proper positioning of the block 32 is empirically determined to ensure that the block 32 ends up in the proper location of the cushioned area 5 of the trim component 1. Therefore, the positioning of the block 32 must take into account the differential stretching and slipping characteristics of different materials of the particular laminated trim component being manufactured. The positioning of the block 32 can be carried out manually or by a mechanical insert placing machine, in either case being guided by the required position offset of the block 32 relative to a centerline, for example, as schematically indicated by a dash-dotted line in FIGS. 3 and 4.

Returning to the above discussion, once the pre-laminated sheet including the components 2, 3 and 32 has been transported to the pre-pressing arrangement in the direction A' as mentioned above, it is positioned on top of the substrate material 4, with the foam pad insert block 32 facing downward and contacting the hot substrate 4. The lower press platen 25 of the pre-pressing arrangement 18 is also heated to about 200° C., so it not only supports, but also further heats the substrate material 4 to prevent the substrate from cooling and rigidifying. On the other hand, the upper press platen 26 is cooled or tempered to a temperature of about 80° C. by circulating a cooling liquid through the passages 27. The upper press platen 26 moves down in the direction of arrow C to press the several layers against the lower press platen 25. The cooled upper press platen 26 thereby prevents an overheating of the cover material 2, so as to avoid charring or otherwise damaging the cover material.

While the materials are being pressed together in the pre-pressing arrangement 18, the heat of the substrate 4 begins to soften or partially melt the contacted surfaces of the foam pad insert block 32 and of the foam backing layer 3, so that the softened or pre-melted materials of the substrate 4, the foam backing layer 3, and the foam pad insert block 32 become hot-melt-bonded to each other. Thereby, the several materials are pre-laminated to form a pre-laminated sandwich packet 28.

Next, the pre-pressing arrangement 18 is opened, and the pre-laminated sandwich packet 28 is transported, e.g. by the transport device 21, into the molding or forming station 12. Instead of the transport arrangement 21, any other transport arrangement (not shown) for linear shifting of a sheet material could be used for this transport step. In the molding or forming station 12, the pre-laminated sandwich packet 28 is taken over and held by the clamping or tentering frame 16 in a proper position between the upper forming tool 14 and the lower forming tool 15. Then, the two forming tools 14 and 15 move together in the direction of the vertical arrows in FIG. 3, whereby the supporting stroke devices 29 of the clamping frame 16 can also shift the vertical position of the frame 16 in an accommodating fashion. As the forming tools 14 and 15 are closed together, the pre-laminated sandwich packet 28 is three-dimensionally deformed and molded, while also undergoing stretching. For this reason the clamping or tentering frame 16 allows tensioned slipping of the materials as necessary.

Figure 6:
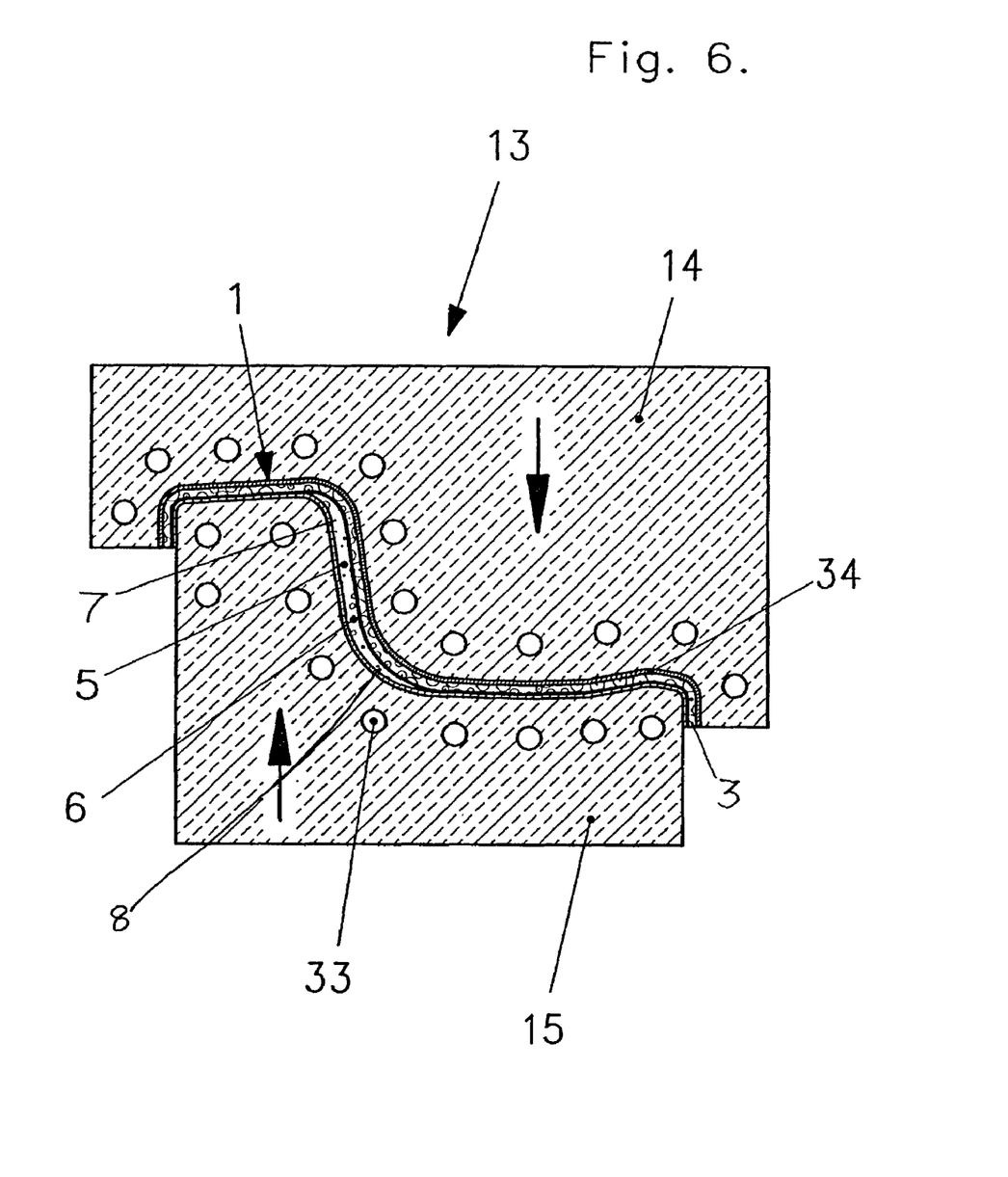
FIG. 6 is a schematic sectional side view of the forming tools of FIG. 5 in a closed condition.

Further details regarding the forming or molding step can be understood in connection with FIGS. 5 and 6, respectively showing the forming press 13 in an open and a closed condition. The heat of the 200° pre-heated substrate material 4 has softened and partially melted the substrate 4, the foam backing layer 3, and the foam pad insert block 32. This allows the respective materials to be three-dimensionally molded in accordance with the contours 30 and 31 of the mold surfaces of the upper and lower forming tools 14 and 15. Also, since the foam pad insert block 32 has a lower melting temperature than the foam backing layer 3 and than the substrate 4, the foam pad insert block 32 becomes more significantly softened and melted than the other components. The block 32 becomes "mushy" and viscously deformable.

Under the high molding pressure applied by the forming tools 14 and 15, the viscous softened material of the block 32 is forced to be deformed into the space between the foam backing layer 3 and the substrate 4, as constrained or defined by the mold contours 30 and 31. Meanwhile, any air that was trapped between the material layers is forced through the substrate 4 and/or the foam backing layer 3 and escapes through small vent holes (not shown) in the forming tools. Thereby, the initial rectangular block-shaped configuration of the foam pad insert block 32, with perpendicular side edges 32A and 32B, is compressed in thickness and elongated or expanded laterally by 10 to 20%, while being deformed into an elongated cross-sectional contour with gradually or smoothly tapering rims 7 and 8 coming to tapered feather-edges 7' and 8' as shown in FIGS. 1 and 6. Also during this hot-pressing, the substrate 4, the material of the foam block 32 (which ultimately forms the deformed foam pad insert 6) and the foam backing layer 3 are thermoplastically hot-melt-bonded to each other. It is therefore not necessary to introduce any additional adhesive between these layers.

The particular molded configuration and thickness of the foam pad insert 6 and of the overall resulting trim component 1 is determined by the mold gap 34 that is formed between the mold surface contours 30 and 31 of the forming tools 14 and 15. As can be seen in FIG. 6, this forming tool gap or mold gap 34 has a substantially constant gap spacing, which results in a substantially constant resulting product thickness, over most of the mold area. However, in the area 5 of the product that is to be provided with a softer or enhanced cushioning area, the mold gap 34 has a larger mold gap spacing, which results in a greater thickness of the product at this area. In any event, the mold gap spacing varies smoothly and tapers smoothly from the larger gap spacing in the area 5, to the narrower constant gap spacing in the other areas. This smoothly increasing mold gap spacing provides the space that must be filled-out by the viscous softened or partially melted foam material of the foam pad insert block 32, which thus necessarily causes the foam block material to be deformed to have the tapering edges described herein. The original volume or amount of foam material of the foam pad insert block 32 is simply selected so that the partially melted and deformed foam block material will be pressurized and deformed to fill (or even slightly overfill) the space created between the foam backing layer 3 and the substrate 4 in the area 5 due to the enlarged mold gap spacing in this area 5.

Meanwhile, the forming tools 14 and 15 are cooled or tempered by flowing a cooling liquid such as water through the passages 33. Thereby, the cooled forming tools remove heat from the laminated arrangement, so that the previously hot softened or partially melted components thereof become solidified and fixed to each other, while also becoming substantially rigid and form-stable in the shape defined by the mold contours 30 and 31.

Figure 7:
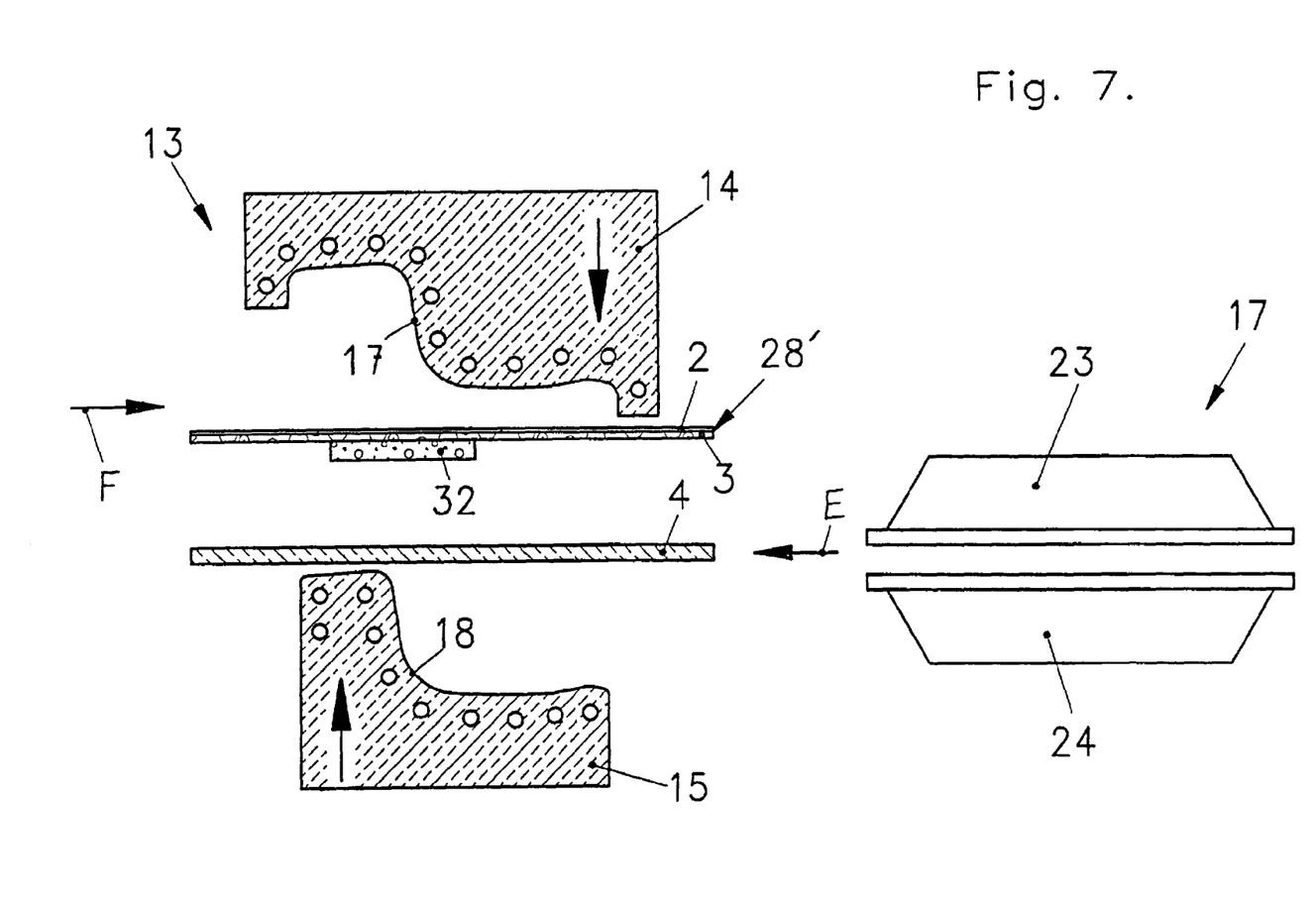
FIG. 7 is a schematic sectional side view of a molding tool and a pre-heating arrangement in an alternative embodiment of the apparatus and method according to the invention.
Figure 8:
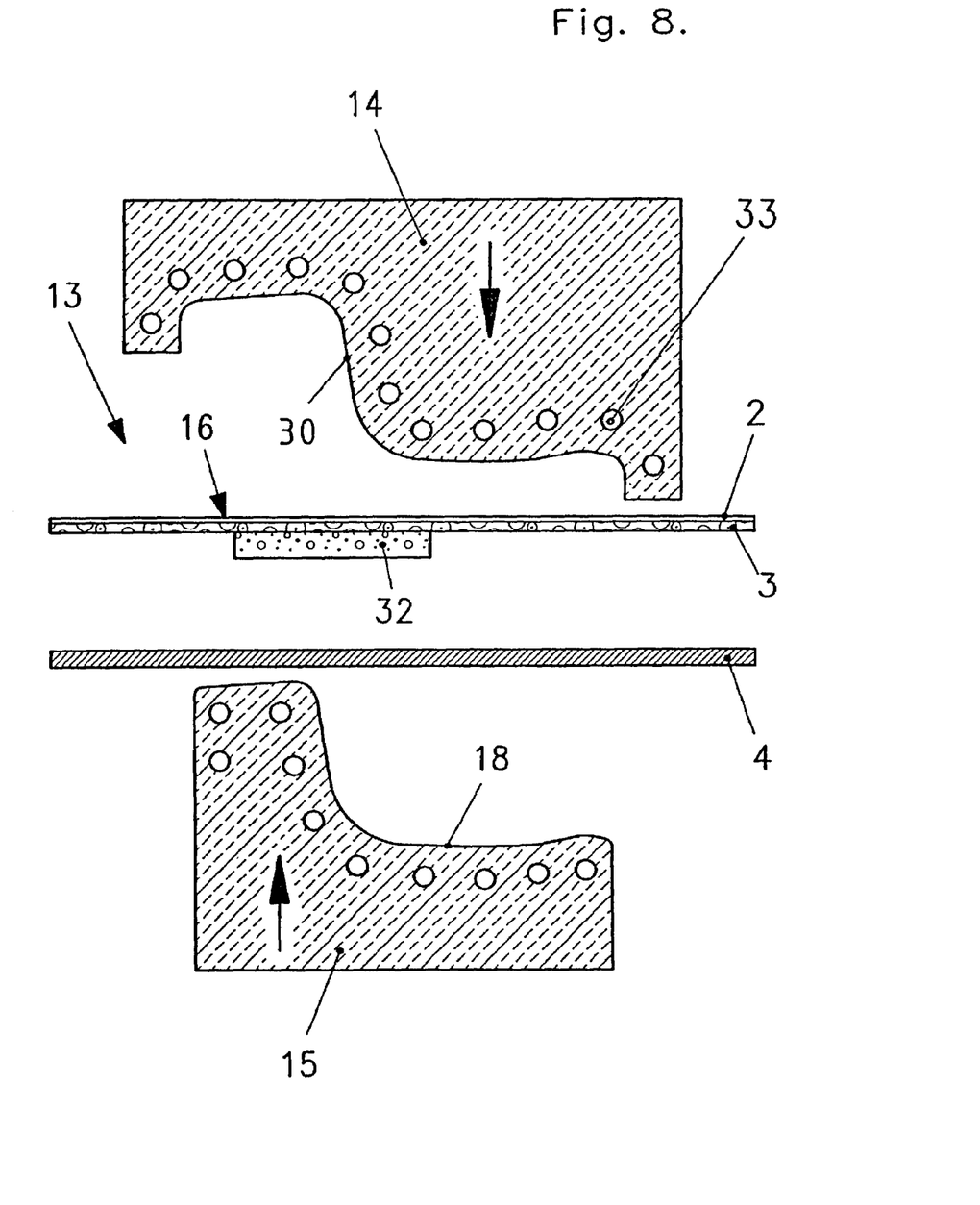
FIG. 8 is a schematic sectional side view of the forming tools according to FIG. 7, on an enlarged scale.

As an alternative to the apparatus and method discussed above in connection with FIGS. 3 and 4, the next FIGS. 7 and 8 represent a simplified apparatus, which omits the pre-pressing arrangement 18. Instead, the pre-heated substrate material 4 is transported directly from the heater arrangement 17 from one side in the direction E into the forming press 13, while the pre-laminated body 28' including the cover material 2, the foam backing layer 3, and the foam pad insert block 32 fixed thereon, is introduced directly into the forming press 13 from the opposite side in the direction F. In this embodiment, the heated substrate 4 is not first pre-pressed and pre-laminated with the pre-laminated body 28' to form a pre-laminated sandwich packet 28 as discussed above in connection with FIGS. 3 to 6. Instead, the pre-laminated body 28' is first separate and spaced apart from the substrate 4, between the upper and lower forming tools 14 and 15, but then the forming tools 14 and 15 are brought together so as to press the several materials into contact with each other, and then to carry out the pressing and forming process therebetween.

While this embodiment of FIG. 7 omits one of the stations and one of the process cycles or steps in comparison to FIGS. 3 and 4, it does not achieve an advantage in the overall process time, because it becomes necessary to allow a longer thermal action time while the materials are in the main forming press 13. In other words, it is still necessary to allow a sufficient time for the heat of the hot substrate 4 to penetrate and act on the foam pad insert block 32 and the foam backing layer 3, so as to soften and partially melt these foam materials. This amount of heat penetration and melting time then limits the cycle time of the forming press 13. All other components and functions of this embodiment can correspond to those described above in connection with the prior figures.

As a further variation of the above described features, it is possible to form a finished trim component 1A according to FIG. 2 simply by providing a suitable recess 35 in the mold contour 31 of the lower forming tool 15, as schematically indicated by a dashed line in FIG. 5. This recess 35 locally enlarges the mold gap 34 even more, so that the hot softened substrate 4 and foam pad insert block 32 are molded into the shape of this recess 35. The partially melted foam material of the block 32 has a sufficient viscosity or compressive hardness, in connection with the molding pressure exerted by the forming tools, so as to press the hot softened substrate material 4 into the recess 35. Additionally, vacuum ports may be provided in the recess 35 if desired or necessary. Thereby, the materials take the configuration as ultimately shown in the finished product trim component 1A of FIG. 2. The recess 35 includes stepped shoulders that form the thickness steps 9A and 11A, but does not cover all of the area of the enlarged mold gap 34, e.g. the area 5A, so as to ensure that the tapering rims 7A and 8A of the foam pad insert 6A will still be formed. This provides the desired enhanced cushioning of the area 5A, without any visibly apparent edge transition on the exposed surface of the cover material 2A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of making a trim component including a cover material layer with a visible exposed surface, a structural substrate, a foam backing layer between said cover material layer and said structural substrate, and a foam pad insert at a limited area between said foam backing layer and said structural substrate, said method comprising the steps:
   a) providing a cover material, a foam backing material comprising a first synthetic thermoplastic foam, a substrate material, and a foam pad insert block comprising a second synthetic thermoplastic foam;
   b) in a pre-pressing apparatus, arranging said cover material, said foam backing material, said foam pad insert block and said substrate material with said foam backing material between said cover material and said substrate material, and with said foam pad insert block between said foam backing material and said substrate material at a given position;
   c) in said pre-pressing apparatus, applying heat to at least said foam backing material and said foam pad insert block and pressing together said cover material, said foam backing material, said foam pad insert block and said substrate material, so as to soften and at least partially thermoplastically melt said foam pad insert block and so as to form a pre-laminated sandwich packet including said cover material, said foam backing material, said foam pad insert block and said substrate material laminated to one another by thermoplastically melt-bonding said substrate material respectively with said foam backing material and said foam pad insert block;
   d) in a forming press distinct from said pre-pressing apparatus, applying pressure to said pre-laminated sandwich packet and thereby thermoplastically deforming said softened and at least partially thermoplastically melted foam pad insert block into a deformed shape having a tapered rim with a smoothly tapering thickness toward an edge thereof; and
   e) after the above steps, cooling said cover material, said foam backing material, said substrate material and said deformed foam pad insert block, to form thereof respectively said cover material layer, said foam backing layer, said structural substrate, and said foam pad insert of said trim component.

2. The method according to claim 1, wherein said foam backing layer has a constant uniform thickness and a back surface that is thermoplastically melt-bonded to said substrate, and wherein said foam pad insert has a back surface that is thermoplastically melt-bonded to said substrate and that tapers smoothly and flushly into said back surface of said foam backing layer.

3. The method according to claim 1, further comprising fixing said foam pad insert block onto said foam backing material at said given position.

4. The method according to claim 3, wherein said fixing comprises applying an adhesive to adhesively bond said foam pad insert block onto said foam backing material at said given position.

5. The method according to claim 3, wherein said fixing comprises applying heat so as to thermoplastically melt-bond said foam pad insert block onto said foam backing material at said given position.

6. The method according to claim 1, wherein said step d) further includes deforming at least said cover material, said foam backing material and said substrate material into a three-dimensionally contoured configuration defining a configuration of said trim component.

7. The method according to claim 1, further comprising, before said step c), a step of heating said substrate material, and wherein said applying of heat in said step c) comprises emitting heat from said heated substrate material to at least said foam pad insert block and said foam backing material.

8. The method according to claim 7, wherein said applying of heat in said step c) is exclusively limited to emitting heat from said heated substrate material to at least said foam pad insert block and said foam backing material.

9. The method according to claim 7, wherein said forming press is an unheated forming press, and said heating of said substrate material is carried out outside of and separate from said pre-pressing apparatus and said unheated forming press.

10. The method according to claim 1, wherein said foam pad insert block initially has a constant uniform thickness and a perpendicular edge, and said deforming of said foam pad insert block causes said deformed shape to have a varying thickness wherein said edge is an acutely tapered feather-edge along said tapered rim.

11. The method according to claim 1, wherein said deformed shape of said foam pad insert block results in a corresponding shape of said foam pad insert, which has a varying thickness wherein said edge is an acutely tapered feather-edge along said tapered rim.

12. The method according to claim 11, wherein a central area of said foam pad insert has a maximum thickness that transitions into said tapered rim at a thickness step, and wherein said substrate has a step contour following and mating with said thickness step.

13. The method according to claim 1, wherein said visible exposed surface of said cover material layer has no visibly apparent surface contour variation at a location corresponding with and indicative of said edge of said tapered rim of said foam pad insert that defines an edge of said limited area.

14. The method according to claim 1,
wherein said forming press comprises first and second mold tools respectively having first and second mold tool surfaces,
wherein said applying of pressure is carried out with said cover material, said foam backing material, said foam pad insert block, and said substrate material received between said first mold tool surface having a first mold contour contacting said cover material and a second mold tool surface having said second mold contour contacting said substrate,
wherein a mold gap formed between said first and second mold tool surfaces has a constant uniform gap spacing at an area other than said limited area and a larger gap spacing larger than said constant uniform gap spacing at said limited area,
wherein said larger gap spacing tapers smoothly to said constant uniform gap spacing, and
wherein a difference between said larger gap spacing and said constant uniform gap spacing corresponds to a difference between said first mold contour and said second mold contour, and corresponds to and defines said deformed shape of said foam pad insert block.

15. The method according to claim 1, wherein said foam pad insert block is provided as a solid elastic block of said second synthetic thermoplastic foam, said applying of said heat and said pressing in said step c) causes said second synthetic thermoplastic foam to soften and partially melt, and said deforming of said foam pad insert block in said step d) comprises a viscous thermoplastic deformation of said softened, partially melted second synthetic thermoplastic foam.

16. The method according to claim 1, wherein said first synthetic thermoplastic foam of said foam backing material is a first polyolefin foam, said second synthetic thermoplastic foam of said foam pad insert block is a second polyolefin foam, and said first polyolefin foam has at least one of a higher melting temperature or a higher density than said second polyolefin foam.

17. The method according to claim 16, wherein a melting temperature of said second polyolefin foam is in a range of 120° C. to 160° C., and a melting temperature of said first polyolefin foam is in a range of 150° C. to 200° C. and is higher than said melting temperature of said second polyolefin foam.

18. The method according to claim 16, wherein said first and second polyolefin foams each respectively comprise the same polyolefin polymer.

19. The method according to claim 1, wherein said first synthetic thermoplastic foam and said second synthetic thermoplastic foam each respectively comprise at least one of a polyethylene foam, a polypropylene foam, or a mixture thereof.

20. The method according to claim 1, wherein said substrate material comprises natural fibers dispersed in a matrix of a synthetic thermoplastic.

21. The method according to claim 1, further comprising a preliminary step before said step b), of empirically determining said given position of said foam pad insert block to ensure that said foam pad insert after said step e) is properly located at said limited area.

22. The method according to claim 1, wherein said step a) comprises pre-laminating said cover material and said foam backing material together to form a pre-laminated sheet, then fixing said foam pad insert block onto said pre-laminated sheet, and using said pre-laminated sheet as a carrier to transport said foam pad insert block together with said pre-laminated sheet into said pre-pressing apparatus where said step b) is then carried out.

23. The method according to claim 1, further comprising an additional step of heating said substrate material between said steps a) and b), and another step of transporting said pre-laminated sandwich packet from said pre-pressing apparatus into a position between first and second forming tools of said forming press, and wherein said step d) comprises applying said pressure by closing said first and second forming tools and said applying of said heat in said step c) comprises emitting heat from said heated substrate material.

24. A method of forming a trim component for an interior of a motor vehicle, comprising the steps:
a) providing a cover layer and a thermoplastic foam layer adjoining one another;
b) positioning and fixing a thermoplastic foam block on a limited area of a back surface of said thermoplastic foam layer opposite said cover layer;
c) heating a substrate layer that contains a thermoplastic material;
d) arranging said heated substrate layer in contact with said thermoplastic foam block and said back surface of said thermoplastic foam layer in a pre-pressing apparatus;
e) in said pre-pressing apparatus, pressing together said cover layer, said thermoplastic foam layer, said thermoplastic foam block and said heated substrate layer, and emitting heat from said heated substrate layer into said thermoplastic foam layer and into said thermoplastic foam block, and thereby softening and partially melting said thermoplastic foam block and forming a pre-laminated sandwich packet including said cover layer, said thermoplastic foam layer, said thermoplastic foam block and said substrate layer laminated to one another;

f) in a forming press distinct from said pre-pressing apparatus, applying pressure to said pre-laminated sandwich packet and thereby viscously deforming said thermoplastic foam block into a sectional shape having a tapered rim terminating at an edge in the form of a tapered feather-edge between said thermoplastic foam layer and said substrate layer; and g) cooling said cover layer, said thermoplastic foam layer, said deformed thermoplastic foam block, and said substrate layer, to form thereof a trim component wherein said deformed thermoplastic foam block provides an area of increased cushioning between said cover layer and said substrate layer.

25. The method according to claim 24, wherein said thermoplastic foam layer comprises a first polyolefin foam, and said thermoplastic foam block comprises a second polyolefin foam having a lower melting temperature than said first polyolefin foam.

26. The method according to claim 24, wherein said cover layer of said trim component has a visible exposed surface over said area of increased cushioning, and said visible exposed surface does not have any visually apparent feature corresponding with and indicative of said edge of said deformed thermoplastic foam block located thereunder.

27. A method of making an interior trim component for a motor vehicle, comprising the steps:

a) heating and pre-compressing a substrate comprising a first thermoplastic;

b) in a pre-pressing apparatus, forming a laminated sandwich by pressing and laminating a cover layer, a thermoplastic foam layer and a thermoplastic foam pad onto said substrate with said foam pad between said foam layer and said substrate and with said foam layer between said cover layer and said substrate, and emitting heat from said substrate into said foam layer and said foam pad so as to melt-bond said substrate with said foam layer and said foam pad, and so as to thermoplastically soften and at least partially melt said foam pad;

c) bringing said laminated sandwich into a forming press; and d) in said forming press, applying pressure and molding said laminated sandwich so as to viscously thermoplastically deform and mold said foam pad into a sectional shape having a tapered rim terminating at a tapered edge at a perimeter of said foam pad between said substrate and said foam layer.

* * * * *